(12) United States Patent
Al-Saqabi

(10) Patent No.: US 8,492,654 B2
(45) Date of Patent: Jul. 23, 2013

(54) ELECTRICAL CONNECTOR

(76) Inventor: Daoud S. A. N. Al-Saqabi, Khaitan (KW)

( * ) Notice: Subject to any disclaimer, the term of this patent is extended or adjusted under 35 U.S.C. 154(b) by 169 days.

(21) Appl. No.: 13/221,959

(22) Filed: Aug. 31, 2011

(65) Prior Publication Data
US 2013/0048374 A1 Feb. 28, 2013

(51) Int. Cl.
*H02G 15/08* (2006.01)

(52) U.S. Cl.
USPC .................. 174/113 C; 174/88 C; 174/84 R; 174/88 R; 439/733.1

(58) Field of Classification Search
USPC ........... 174/92, 84 R, 84 S, 135, 88 R, 113 C, 174/70 R; 439/733.1
See application file for complete search history.

(56) References Cited

U.S. PATENT DOCUMENTS

| | | | |
|---|---|---|---|
| 331,358 A * | 12/1885 | Sachs et al. | 172/202 |
| 1,886,086 A | 11/1932 | Damon | |
| 3,281,524 A | 10/1966 | Lynch, Jr. et al. | |
| 3,317,658 A | 5/1967 | Smith | |
| 3,538,240 A | 11/1970 | Sherlock | |
| 3,810,078 A | 5/1974 | Chordas | |
| 4,077,697 A | 3/1978 | Yates | |
| 5,422,438 A | 6/1995 | Lamome | |
| 7,319,194 B2 * | 1/2008 | Bryla | 174/84 R |
| 7,786,383 B2 | 8/2010 | Gumley | |
| 7,833,038 B1 * | 11/2010 | King et al. | 439/276 |
| 8,319,104 B2 * | 11/2012 | Camp et al. | 174/113 C |
| 2010/0190386 A1 * | 7/2010 | Stromiedel | 439/733.1 |

* cited by examiner

*Primary Examiner* — Hoa C Nguyen
*Assistant Examiner* — Paresh Paghadal
(74) *Attorney, Agent, or Firm* — Lowe Hauptman Ham & Berner, LLP

(57) ABSTRACT

An electrical connector for connecting the conductors of two cables together includes a longitudinally extending triangular-shaped inner body and three A-shaped outer body members with one of the body members' integral with an outer end of each of the radially extending walls. The connector also includes an outer tubular housing extending around the triangular inner body member and A-shaped outer members. In addition, the connector includes three pair of clamps at each end for fixing and positioning the conductors in place and in contact with two longitudinally extending conductors.

5 Claims, 4 Drawing Sheets

ELECTRICAL CONNECTOR

FIELD OF THE INVENTION

This invention relates to an electrical connector and more particularly to an electrical connector for joining two cables together and in which the cables each include one, two, or three conductors.

BACKGROUND FOR THE INVENTION

Wire connecting devices are well known and have been in wide spread use for a number of years. For example a Yates U.S. Pat. No. 4,077,697 discloses an improved device for making electrical terminal type connections and for physically electrically joining one or more electricity-conducting wires to a terminal and in wire-to-wire connections. A wire receiving sleeve member is adapted to cooperate with an electrical terminal or the like. For purposes of new physical and electrical connections of wires or wires and terminal members means for removeably locking together the connected parts are provided.

A more recent approach to electrical connectors is disclosed in a Lamome U.S. Pat. No. 5,422,438. As disclosed an electrical crimp connector comprises a crimp barrel located within an insulating sleeve and a quantity of gel located within each end region of the insulating sleeve at each end of the crimp barrel. Each quantity of gel contains an aperture to allow wires to be inserted into the crimp barrel. Once the connector has been crimped, the gel located within each end region of the insulating sleeve seals it against moisture ingress, forming a moisture-resistant electrical connection.

Finally, a Gumley U.S. Pat. No. 7,786,383 discloses an electrical wire connector with a temporary grip. As disclosed, the connector includes a crimpable tubular body including a receiving portion for receiving a wire conductor via an opening at a longitudinal end of the tubular body. The tubular body provides a permanent electrical connection to the wire conductor only upon at least a portion of the tubular body being crimped. The receiving portion has a tapered shape and inward projections for engaging the wire conductor to provide sufficient frictional force to resist removal of the wire conductor from the receiving portion prior to crimping, without providing a permanent electrical connection between the tubular body and the wire conductor. In one implementation, the electrical connector is a butt connector with two such equally sized receiving portions for splicing together two wires. In another implementation, the electrical connector is a butt connector with two different sized receiving portions for splicing together two different sized wires.

Notwithstanding the above, it is presently believed that there is a need and a potential commercial market for an improved electrical connector in accordance with the present invention. There should be a need for such connectors because they allow an individual to make an electrical repair while minimizing the likelihood of electric shock and also reduce the likelihood of a short due to water or excess humidity. Further, the devices in accordance with the present invention are easy to use, rugged in use and can be produced and sold at a reasonable cost.

Further, the use of the invention reduces the user's time, because within seconds, a user can connect two to three conductor wires allowing electricity to pass as opposed to stripping each insulated wire, twisting them together by hand and taping the splice. Further, the invention reduces the likelihood of a user receiving an electrical shock. In addition, the invention prevents corrosion due to water and/or excess humidity since the wires are protected against moisture.

BRIEF SUMMARY OF THE INVENTION

In essence, the present invention contemplates an electrical connector for joining two cables each of which contains one or more separate conductors together to complete an electrical connection. The electrical connectors include a longitudinally extending triangular shaped inner body having a central core, two, or three outwardly extending walls, two or three outer body members with one of the body members disposed on an outer end of each of the walls, and wherein the number of walls and body members are equal to at least the number of conductors in a cable being joined together. An outer insulating housing in the form of a cylindrical tubular sleeve extends around the longitudinally extending triangular inner body and the body members. In addition, a plurality of clamping members has a flat rectangular mounting element, a cylindrical clamping element and a flat deformable connecting element connecting together the mounting member and the clamping element. Further, a plurality of pairs of longitudinally extending conductive elements each of which includes two inwardly directed flat contact elements for engaging contact with one of the conductors of each of the two cables being joined together.

The invention will now be described in connection with the accompanying drawing wherein like reference numerals have been used to indicate like parts.

DESCRIPTION OF THE PREFERRED EMBODIMENTS OF THE INVENTION

Figure 1:
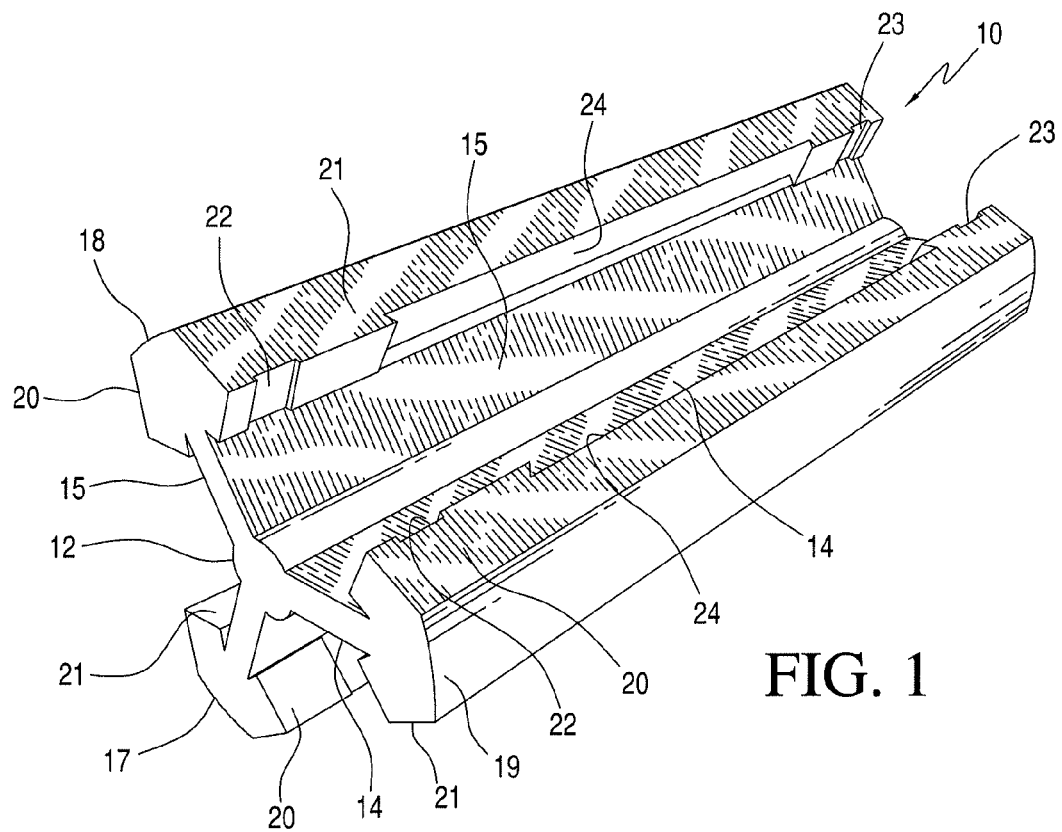
FIG. 1 is a perspective view of a longitudinally extending triangular inner body as incorporated in the present invention.
Figure 2:
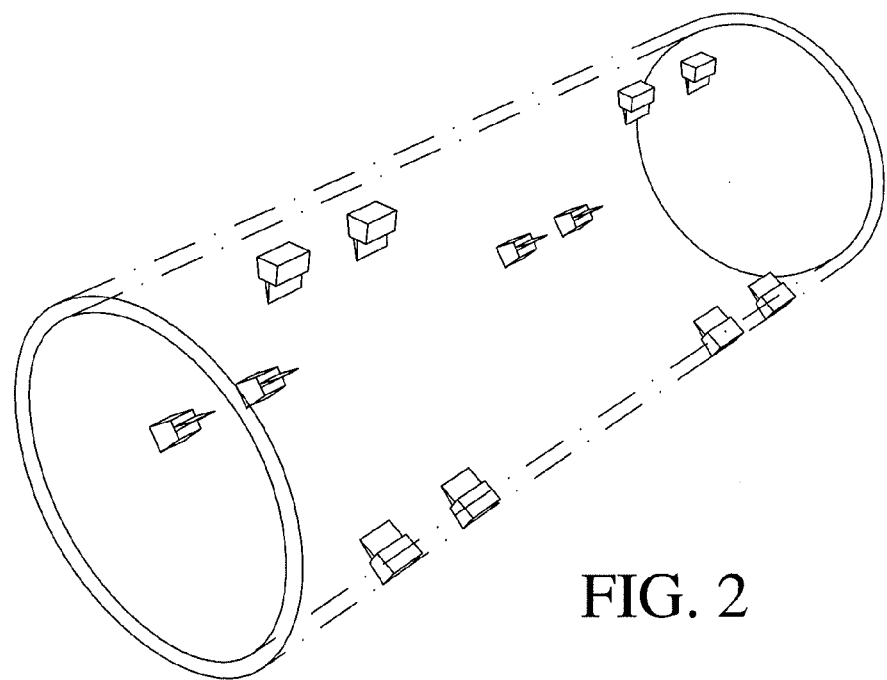
FIG. 2 is a perspective view of an insulating outer housing as incorporated in the present invention.

An electrical connector 100 (see FIGS. 7, 8 and 9) in accordance with a preferred embodiment of the invention includes a longitudinally extending triangular shaped inner body 10 (see FIG. 1) that is made of an insulating material such as a silicon nitride, silicon carbide, silicon nitride molybdenum disilicide or other ceramic element. The inner body includes a core 12 with three outwardly or radially extending walls 13, 14, 15 extending outwardly from the core 12. In addition, three A-shaped outer body members 17, 18, and 19 are disposed on or preferably integral with the outer ends of the walls 13, 14 and 15 respectively. The outer surface of the outer body members 17, 18 and 19 have a slightly arc shape with two over lapping portions 20 and 21. One of the portions 20 and 21 are on each side of a wall. The portions 20 and 21 each include a generally downwardly sloping flat surface and a pair of slots 22 and 23 with one of the slots at each end of the portions 20 and 21. In addition each of the generally flat surfaces includes an elongated intermediate slot 24 that is between the slots 22 and 23.

The connector 100 also includes an outer insulating housing 30 (FIGS. 2, 7, 8 and 9) in the form of a cylindrical tubular sleeve that extends around the longitudinally extending triangular shaped inner body 10 and three outer body members 17, 18 and 19 with an outer arc shaped wall in contact with an inner wall of the housing 10. In this embodiment, the outer housing 30 and walls 13, 14 and 15 each define a passageway for one of the conductors in each cable.

Figure 3:
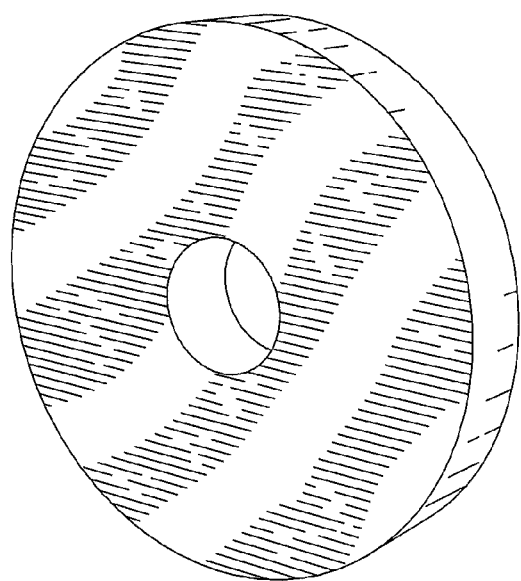
FIG. 3 is a perspective view of an end cap as used in the present invention.

FIG. 3 illustrates one of a pair of end caps 32 which are preferably made of rubber or neoprene for sealing each end of the electrical conductor 100 as shown more clearly in FIG. 9.

Figure 4:
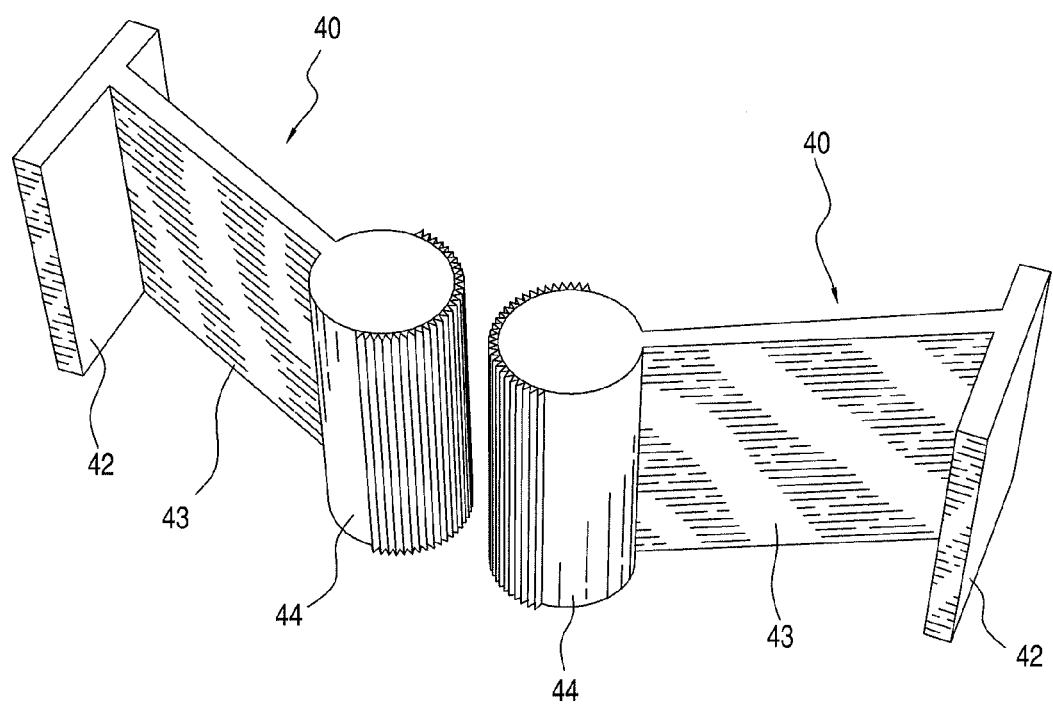
FIG. 4 is a perspective view of an inner clamping arrangement as used in the present invention.

A first of said outer body members 17 including portions 20 and 21 each include generally flat surfaces including the pair of slots 22 and 23 with one of the slots at or near each of the outer body members 17 as well as the intermediate slot 24. Referring now to FIG. 4, the connector 100 (not shown in FIG. 4) includes a plurality of clamping members 40 (FIG. 4). Each of the clamping members 40 include a generally flat rectangular mounting element 42, a generally cylindrical clamping element 44 and a deformable connecting element 43 that connects the clamping element 44 to the mounting element 42. The clamping element 44 may also include a series of fine grooves across its surface to aid in gripping and/or positioning one of the insulated conductors.

A pair of clamping members 40 is shown in a confronting relationship to clamp a conductor in place for connection to a conductor in a second cable that will be clamped in a generally aligned position by a second set of clamping members. Each of the clamping members 40 include the rectangular mounting element 42 as well as the cylindrical clamping element 41. In addition, a generally deformable or slightly flexible connecting element 43 connects the elements 42 and 44 and positions the clamping elements 44 in a slightly spaced apart for clamping one of the insulated conductors of one of the cables in place with conductive clamping between the elements 44. As shown each of the cylindrical elements 40 includes the plurality of parallel fine grooves extending across the cylindrical portion and around that portion.

Figure 5:
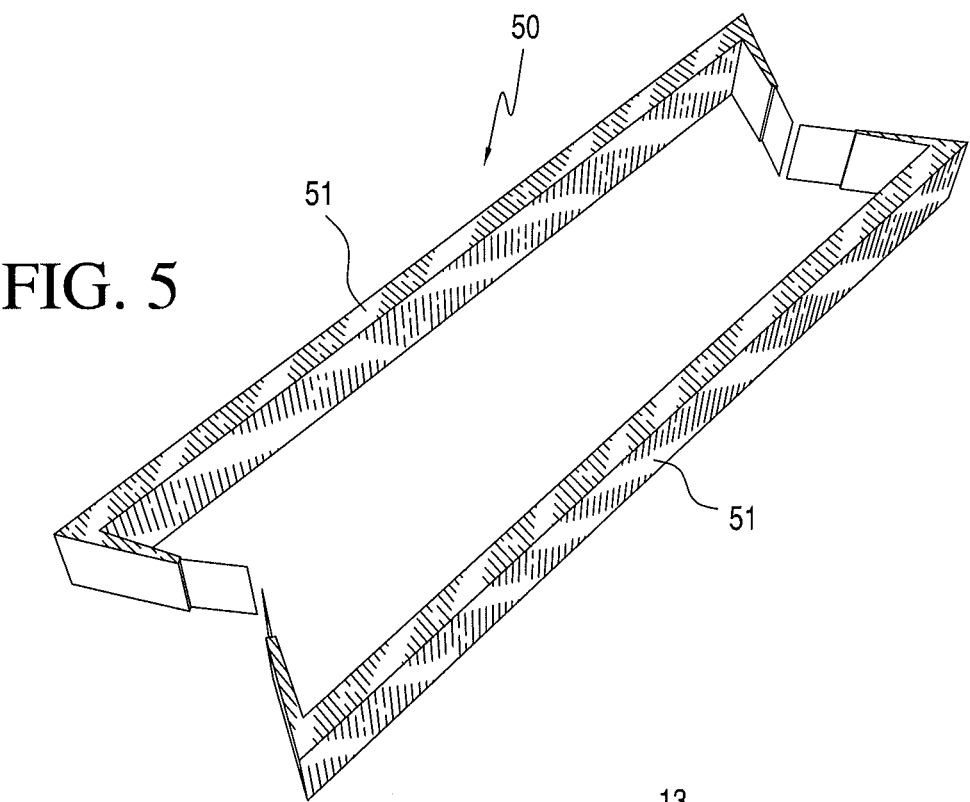
FIG. 5 is a perspective view of a pair of inner connecting conductors as incorporated in the present invention.

FIG. 5 shows a pair of electrical conductors 50 wherein each of the conductors 50 include a longitudinally extending conducting element 51 and a pair of inwardly directed contacts 52 and 53 for conducting electricity form a first cable to a second cable. A first of said contacts 52 are angled inwardly toward the other contact 53 and are made of a conducting material as for example copper and form a relatively narrow strip taken from a copper or alloy sheet. The pair of electrical conductors 50 is disposed in confronting sides of adjacent walls so that the contacts 52 confront one another and engage one of the conductors of one of the cables. At the opposite end, the contacts 53 are arranged in a similar manner to contact a conductor of the second cable.

An overview of the internal parts of a connector 100 will now be described in connection with FIG. 6. As shown, the triangular shaped inner body 10 includes a core 12 and three radially extending walls 13, 14 and 15 extending outwardly from the core 12. Three outer body members 17, 18 and 19 are fixed to or integral with an outer portion of the walls 13, 14 and 15 respectively. As shown more clearly in FIG. 6, each of the outer body portions includes first and second body portions 20 and 21.

Each of the body portions 20 and 21 include a longitudinally extending generally flat surface and wherein a body portion 21 is in a generally confronting position with respect to an adjacent body portion 20. Each of the flat surfaces of the confronting portions 20 and 21 include a pair of slots 22 and 23 with one of the slots 22 in a forward portion thereof and a second of the slots 23 in a rear portion thereof. The flat surfaces of the portion 21 also includes a longitudinally extending intermediate slot 24.

Figure 6:
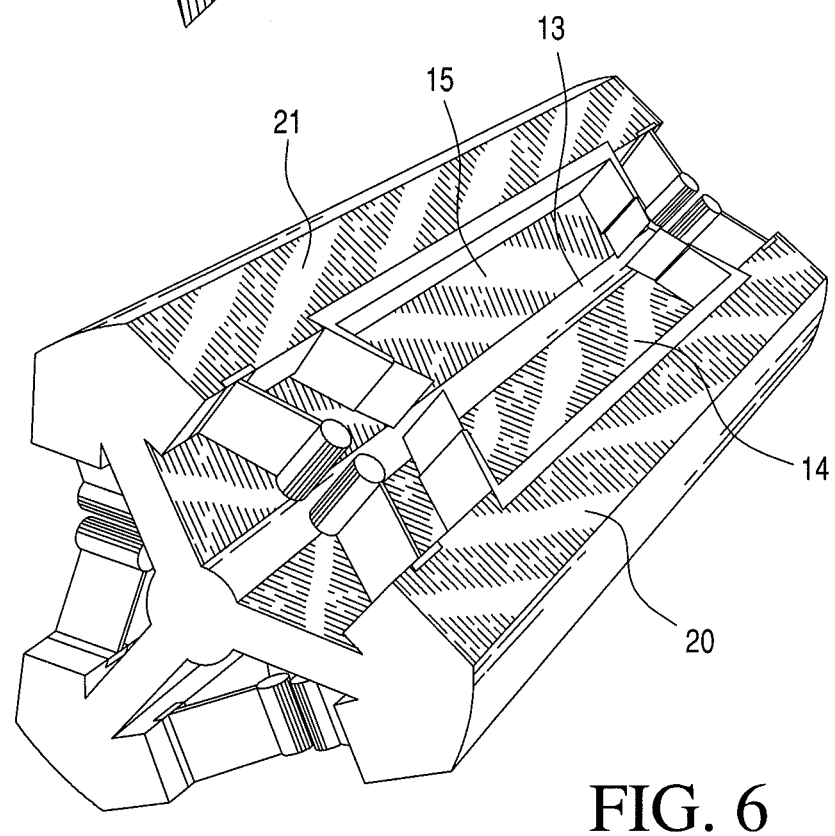
FIG. 6 is a perspective view of an inner assembly as used in the present invention.

As illustrated in FIG. 6 one of the rectangular mounting members 42 of a champing member 40 is disposed in each of the slots 22 and 23. Likewise, a third and fourth rectangular mounting member 42 of two additional clamping members 40 are disposed in the slots 22 and 23 in an adjacent radially extending wall. Each of the clamping members 40 are angled inwardly so that the cylindrical portion thereof grip an insulated conductor.

Figure 7:
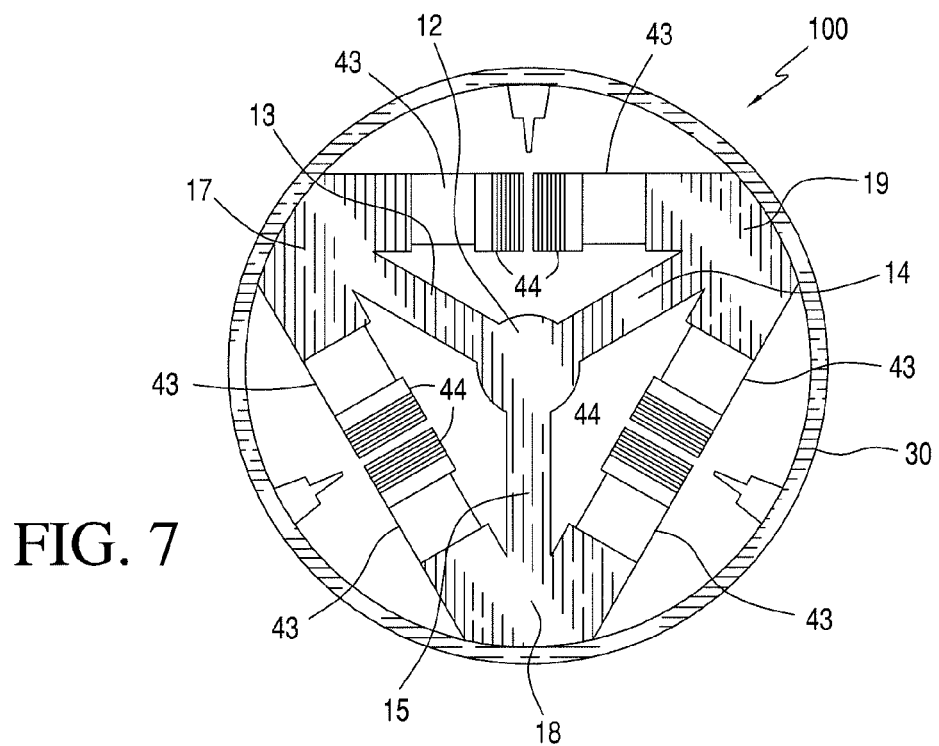
FIG. 7 is an end view with cap removed of a connector in accordance with a first embodiment of the invention.
Figure 8:
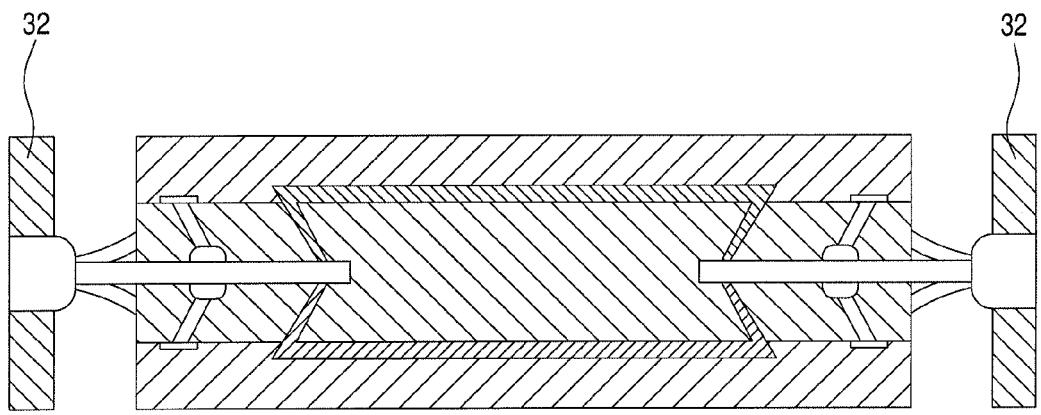
FIG. 8 is a side elevational view of a connector in accordance with the first embodiment of the invention.

In accordance with a first embodiment of the invention, an end view of a connector 100 with an outer housing 30 but with one of the sealing rings 32 removed is shown in figure 7. As shown, the inner body includes a core 12 and three radially extending walls 13, 14 and 15 without outer body members 17, 18 and 19. As stated, the outer bodies 17, 18, and 19 have an arc shaped outer portion that corresponds to the inner circumference of the outer housing 30 and fit snuggly against the housing 30. The outer housing may be flexible so that a release member may be accessed to spread the two adjacent clamping elements 44 to install or release one of the conductors. As an alternative, the release member may be moveable inwardly to release the clamping or to spread the clamping members apart.

While the invention has been described in connection with its preferred embodiment it should be recognized that changes and modifications may be made therein without departing from the scope of the appended claims.

What is claimed is:

1. An electrical connector for joining two cables each of which contain up to three separate insulated conductors to complete an electrical connection, said electrical connector comprising:
   a longitudinally extending inner body having a central core and three radially extending walls and three generally A-shaped outer body members with one of said outer body members disposed on or integral with each of said walls and wherein each of said A-shaped outer body members extend over onto each side of each of said walls with a flat inwardly directed surface on each side of each of said walls;
   an outer insulating housing in the form of a cylindrical tubular sleeve extending around said longitudinally extending inner body in said outer body member;
   a plurality of clamping members having a flat rectangular mounting element, a cylindrical clamping element, and a flat connecting element connecting said mounting element in said clamping element in a plurality of longitudinally extending electrical connecting elements each of which includes two inwardly directed end contacts; and
   a plurality of pairs of inwardly directed slots on each of said flat inwardly directly surfaces on each side of said walls for receiving and holding one of said mounting elements therein and a longitudinally extending intermediate slot between each of said pairs of inwardly directed slots on each side of each wall for receiving and holding one of said electrical contact elements.

2. An electrical connector for joining two cables in which each cable contains three separate conductors together to complete an electrical connection according to claim 1 in which each of said cables includes three separate conductors and wherein said longitudinally extending inner body has three radially extending walls and a triangular shape together with three outer body members.

3. An electrical connector for joining two cables together to complete an electrical connection and wherein each of said cables contain three separate insulated conductors, said connector consisting of:
- a longitudinally extending triangular shaped inner body having a central core, three radially extending walls and three generally A-shaped outer body members with one of said generally A-shaped outer body members integral with an outer end of each of said walls and wherein each of said walls and wherein each of said generally A-shaped outer body members extend over opposite sides of a radially extending wall;
- an outer insulating housing in the form of a cylindrical tubular sleeve extending around said longitudinally extending triangular inner body and said outer body member;
- a plurality of clamping members wherein each of said clamping members has a generally flat rectangular mounting element, a cylindrical clamping element and a flat deformable connecting element connecting said mounting element and said clamping element and a longitudinally extending contacting member with a pair of inwardly directed end contacts adapted to conduct electricity from one end of a first cable to an end of another cable; and
- a plurality of pairs of inwardly directing slots in each of said flat surfaces near the outer ends of said surface of said A-shaped outer body member for receiving and holding one of said mounting elements on each side of each of said walls and a longitudinally extending intermediate slot in said flat surface between said pair of inwardly directed slots for receiving and holding one of said connecting members.

4. An electrical connector for joining two cables together to complete an electrical connection and wherein each of said cables include three conductors according to claim 3 which includes three wedge shaped separators for separating each of said clamping elements from an adjacent clamping element.

5. An electrical connector for joining two cables together to complete an electrical connection and wherein each of said cables include three conductors according to claim 4 which includes a pair of rubber or neoprene end caps for sealingly closing the ends of said connector against penetration by water and/or humidity.

* * * * *